June 21, 1949.    A. E. CUTHRELL    2,474,037
PORTABLE BRUSH AND TREE CUTTING MACHINE
OF THE HAMMER-DRIVEN CUTTER BLADE TYPE
Filed Feb. 28, 1946    2 Sheets-Sheet 1
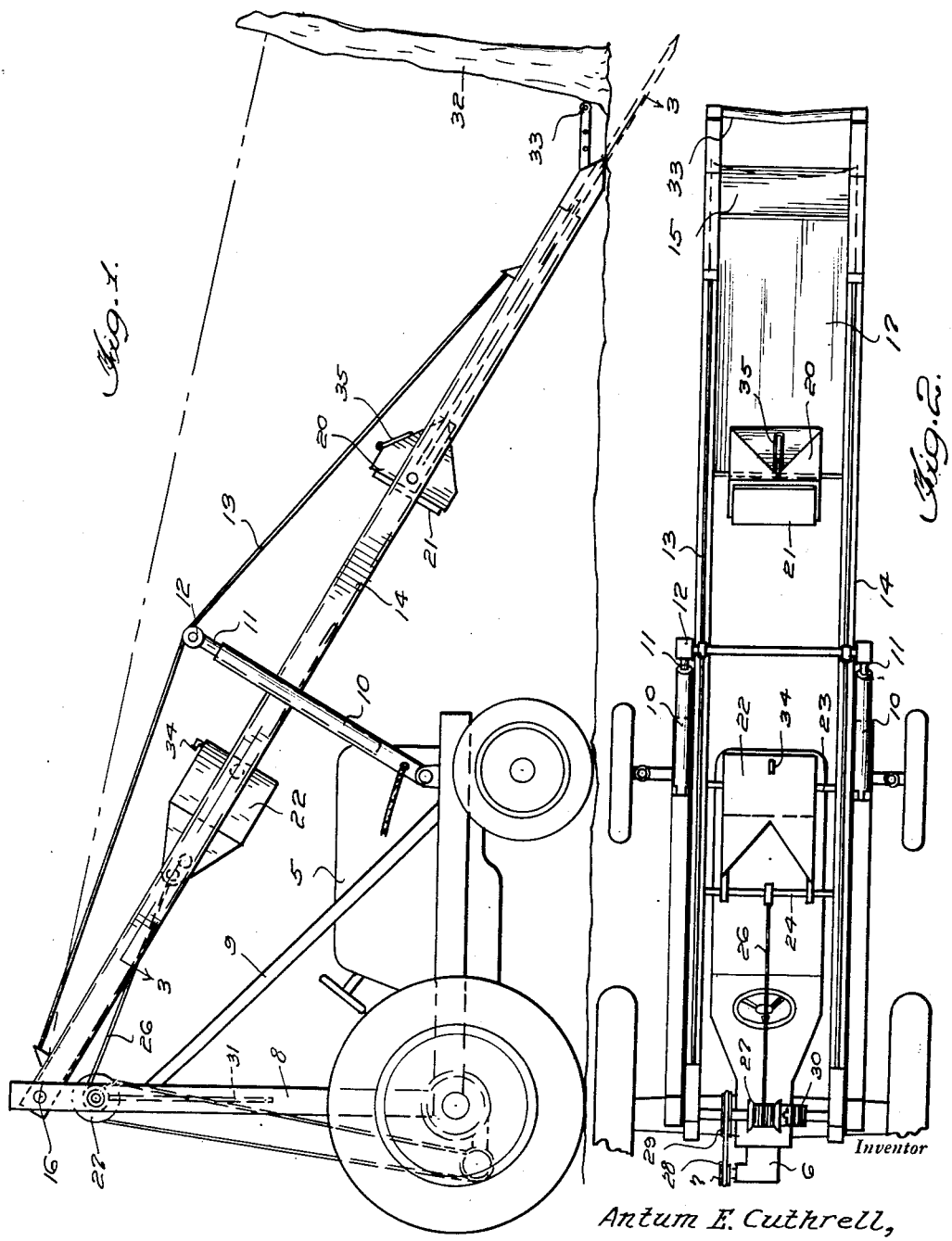
Inventor
Antum E. Cuthrell,
By Clarence A. O'Brien
and Harvey B. Jacobson
Attorneys

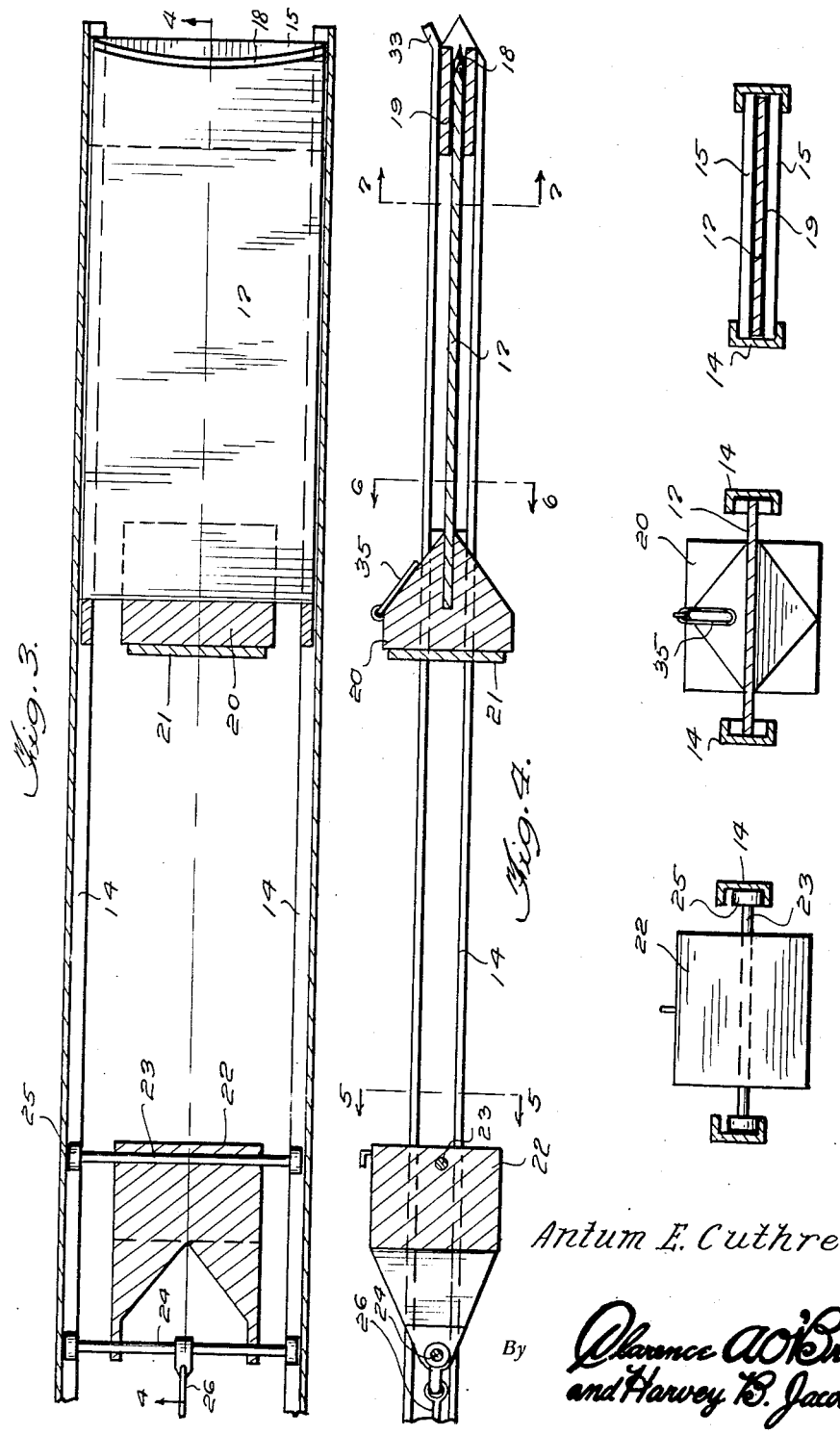

Patented June 21, 1949

2,474,037

UNITED STATES PATENT OFFICE 2,474,037

PORTABLE BRUSH AND TREE CUTTING MACHINE OF THE HAMMER-DRIVEN CUTTER BLADE TYPE

Antum E. Cuthrell, Pleasanton, Tex.

Application February 28, 1946, Serial No. 651,004

1 Claim. (Cl. 144—34)

The present invention relates to new and useful improvements in portable machines of the hammer-driven cutter blade type for clearing brush and trees from grazing land, and more particularly to machines of this character designed for eradicating mesquite and also for cutting trees for lumber.

An important object of the present invention is to provide a machine of this character by means of which trees and brush are cut below the surface of the ground at a point below the sprout growth in order to eliminate the possibility of the tree again sprouting and also to perform the cutting action in a manner to avoid disturbing of the turf so that the value of the grazing land is not decreased and the danger of erosion to the land is eliminated.

A further object of the invention is to provide a tree cutting machine of this character adapted for operatively mounting on a conventional form of farm tractor and without necessitating any material changes or alterations in the construction thereof.

Another object is to provide a device of this character of simple and practical construction, which is strong and durable, efficient and reliable in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is a longitudinal sectional view taken substantially on a line 3—3 of Figure 1.

Figure 4 is a longitudinal sectional view taken on a line 4—4 of Figure 3, and

Figures 5, 6 and 7 are transverse sectional views taken respectively on the lines 5—5, 6—6 and 7—7 of Figure 4.

Referring now to the drawings in detail wherein for the purpose of illustration, I have disclosed a preferred embodiment of invention, the numeral 5 designates a farm tractor of conventional construction and which includes a power take-off device 6 at its rear end for driving a pulley 7.

A pair of posts 8 are suitably attached to the sides of the frame of the tractor at the rear end thereof and supported in an upright position by braces 9.

To each side of the frame of the tractor is pivoted the lower ends of a pair of hydraulic rams 10, the rams extending upwardly and forwardly of the tractor and include plungers 11 slidably mounted in the upper end thereof. Pressure may be applied to the ram in any suitable manner from the tractor to raise and lower the plungers 11. The upper ends of the plungers are connected by a cross bar 12 on which is supported a pair of longitudinally extending truss rods 13 having their ends attached adjacent the front and rear ends of a pair of spaced parallel channel frame members 14.

The frame members 14 are connected to each other at their front ends by a guide 15 which rigidly connects the front end of the frame members to each other and the rear ends of the frame members 14 are pivoted to the inside of the upper ends of the posts 8 as shown at 16 to provide for the vertical raising and lowering movement of the front ends of the frame.

The channels of the frame members 14 are arranged in opposed relation to form tracks in which the side edges of an elongated blade 17 are adapted to travel, the front end of the blade having an inwardly curved cutting edge 18 and is slidably received in a slot 19 in the guide 15, the blade thus being adapted for movement forwardly of the frame 14.

The rear end of the blade 17 is recessed in an anvil 20 having a reinforced rear striking face 21.

A weighted hammer 22 is provided with front and rear axles 23 and 24 projecting outwardly at each side thereof and on which rollers 25 are mounted for traveling in the tracks or channel members 14, the hammer being positioned between the tracks and adapted to strike the anvil 20 during its downward traveling movement.

The hammer 22 may be constructed of solid material, or if desired, may be constructed of a hollow member adapted to be filled with water to add the desired weight thereto when in use, the water being drained to reduce the weight of the hammer for transportation purposes.

A hoisting cable 26 is attached to the rear axle 24 of the hammer and extends rearwardly over a winch 27 operatively mounted on the upper portion of the posts 8, the winch being driven by means of a belt 28 and pulley 29 from the pulley 7 of the power take-off. The winch includes a conventional form of clutch device 30 operated by a lever 31 extending downwardly therefrom between the posts 8.

The hammer 22 is provided with a front hook 34, and the anvil 20 is provided with a pivoted link 35 for swinging over the hook 34 to couple the anvil to the hammer so that the hammer may be used to withdraw the blade 17 from the ground and/or elevate the same for carrying purposes.

From the foregoing it is believed the manner of operation of the device will be apparent, the front end of the frame 14 first being lowered to the ground adjacent one side of a tree or brush 32 whereby a blow struck upon the anvil 20 by the hammer 22 will drive the blade 17 downwardly through the ground under the tree 32 to sever the roots thereof below the surface of the soil.

An adjustable stop 33 projects forwardly at the front end of the frame 14 to provide a means for controlling the depth of the cut below the sprout growth of the tree and to prevent the falling of the tree rearwardly on the machine.

In view of the foregoing description taken in conjunction with the accompanying drawings it is believed that a clear understanding of the construction, operation and advantages of the device will be quite apparent to those skilled in the art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A tree felling apparatus comprising in combination, a power operated vehicle, a pair of tracks, means pivotally supporting the tracks at corresponding ends thereof on one end of the vehicle to incline downwardly over the vehicle longitudinally thereof and be swung vertically to vary the inclination of said tracks, a cutter slidably mounted on the lower ends of the tracks for movement downwardly under the base of a tree, an anvil at the rear end of the cutter, a hammer mounted to travel downwardly on the tracks to strike the anvil, means connecting the hammer to the power plant of the vehicle for raising the hammer, means for connecting the anvil to the hammer for raising the cutter to withdraw the cutter from the ground, and a pair of upstanding rams on the other end of the vehicle pivoted thereon and pivotally connected to said tracks to vary the inclination thereof with said tracks interposed between the rams of the pair and suspended adjacent both ends therefrom.

ANTUM E. CUTHRELL.

REFERENCES CITED

The following references are of record in the file of this patent:

UNITED STATES PATENTS

| Number | Name | Date |
|---|---|---|
| 551,989 | Munro | Dec. 24, 1895 |
| 984,412 | Andrews | Feb. 14, 1911 |
| 2,295,458 | Edwards | Sept. 8, 1942 |